April 24, 1962     L. BOLSTON     3,031,528

LOUDNESS METER

Filed Nov. 1, 1960     2 Sheets-Sheet 1

INVENTOR.
Leonard Bolston
BY
ATTORNEY

INVENTOR.
Leonard Bolston
BY
Paul J. Ethington
ATTORNEY

United States Patent Office 3,031,528
Patented Apr. 24, 1962

3,031,528
LOUDNESS METER
Leonard Bolston, Mount Clemens, Mich., assignor to General Motors Corporation, Detroit, Mich., a corporation of Delaware
Filed Nov. 1, 1960, Ser. No. 66,575
6 Claims. (Cl. 179—1)

This invention relates to apparatus for detecting sound pressure and indicating the corresponding loudness.

Noise can easily be measured by detecting sound pressure level, but this type of measurement has little meaning since the human reaction to noise is not linearly related to sound pressure. The loudness or apparent magnitude of various sounds can be defined by empirically-derived functions which were established by experiments with large numbers of persons. Such experiments are described in an article by S. S. Stevens in the September 1957 issue of the publication "Noise Control," pp. 11-22. It has been found that loudness varies as a function of sound pressure according to a different relationship for the various frequency bands in the audio spectrum. Also, when noise having amplitude peaks at several spaced frequencies is present, then the total loudness can be defined by a certain relationship between the loudness in the band having the maximum sound pressure and the loudness in the remaining bands. One way of expressing this relationship is according to a function: $S_T = S_M + 0.3(S - S_M)$, where $S_T$ is the total loudness, $S_M$ the maximum loudness from the several frequency bands in the audio spectrum, and S is the sum of the loudness in all of the frequency bands.

It is presently proposed to provide apparatus for producing a reading of total loudness wherein the sound in question contains components in several frequency bands.

In accordance with this invention, a pickup is utilized to detect sound pressure to produce a signal corresponding thereto. This signal is fed to a plurality of filters corresponding to the frequency bands in the audio spectrum. The signal output from each filter, related to the sound pressure in its particular band, is applied to a function generator which produces an output corresponding to the subjective loudness characteristic for this particular band. The maximum loudness signal appearing on the various frequency bands is detected, and this maximum signal is combined with the sum of all the loudness signals according to a certain relationship. The combined signal is indicated, in units of sones if desired, providing a reading of the loudness of a complex noise.

Figure 1:
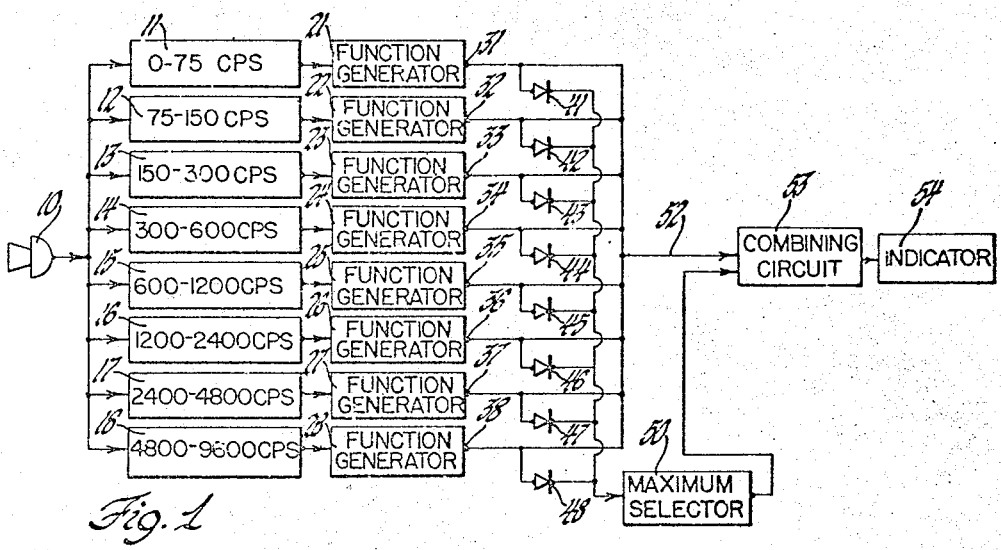
FIGURE 1 is a block diagram of loudness measuring apparatus incorporating the principal features of the invention.

With reference to FIGURE 1, there is shown a sound pressure pickup 10 which may take the form of a transducer such as the conventional condenser microphone adapted to produce an A.C. output linearly related to sound pressure. This A.C. output is applied separately to the inputs of eight octave band filter circuits 11—18 which essentially cover the audio spectrum. The output of each filter circuit is applied to the input of one of a plurality of function generators 21—28, each of which produces an output signal at one of a set of output terminals 31—38 which is related to sound pressure by the subjective loudness characteristic for the particular frequency band. Each of the output terminals 31—38 is connected separately through one of a plurality of diodes 41—48 to a common line 49 which is applied to the input of a maximum selector or voltage discriminator 50. The maximum selector 50 is adapted to detect the signal of greatest magnitude and to provide an inverted signal output corresponding to this maximum signal. The output terminals 31—38 are further connected to a common line and to an input 52 of a combining circuit 53 which also receives the output of the maximum selector 50. This combining circuit 53 produces an output related according to a certain function, such as the mathematical expression set forth above, to the sum of the function generator outputs and to the maximum selector output. The combined output from the circuit 53 is applied to an indicator 54 which provides an output reading of loudness.

Figure 2:
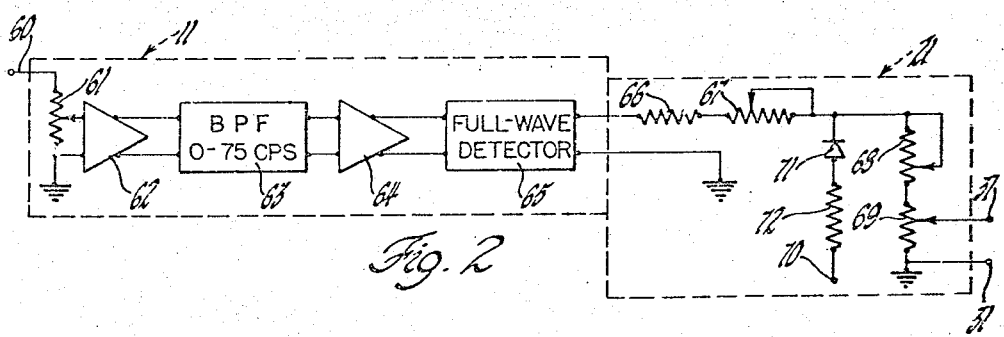
FIGURES 2 and 3 are schematic diagrams of portions of the apparatus of FIGURE 1.

With reference to FIGURE 2, the filter circuit and function generator for one of the octave band channels of FIGURE 1 are shown in more detail. More specifically, the filter circuit 11 for the lowest frequency channel is illustrated along with the function generator 21 which is adapted to produce an output voltage related to loudness within this frequency band. The filter circuit 11 includes an input terminal 60 which is coupled to the microphone 10 through suitable pre-amplifiers, if necessary. A potentiometer 61, is connected across the input for calibration purposes, and a tapped portion of the output of this potentiometer is connected through an amplifier 62 to a bandpass filter 63. This filter is responsive only to the lowest frequencies of the audio spectrum, designated as 0–75 cycles per second. The output of the filter 63 is applied through an amplifier 64 to a full-wave detector circuit 65, producing a D.C. output corresponding to the magnitude of the A.C. signal produced by the microphone 10 within the frequency range of the filter 63. The D.C. output is applied to the function generator 21 which includes a voltage divider arrangement including several resistors 66, 67, 68, and 69. The output terminal 31 of the function generator 21 is connected across a tapped portion of the variable resistor 69. The junction point of the resistors 67, 68 is connected to a negative voltage source 70 through a Zener diode 71 and a resistor 72 to provide a break point in the transfer characteristic of the function generator so that the loudness vs. sound pressure curve as set forth in FIGURE 4 will be approximated.

Figure 3:
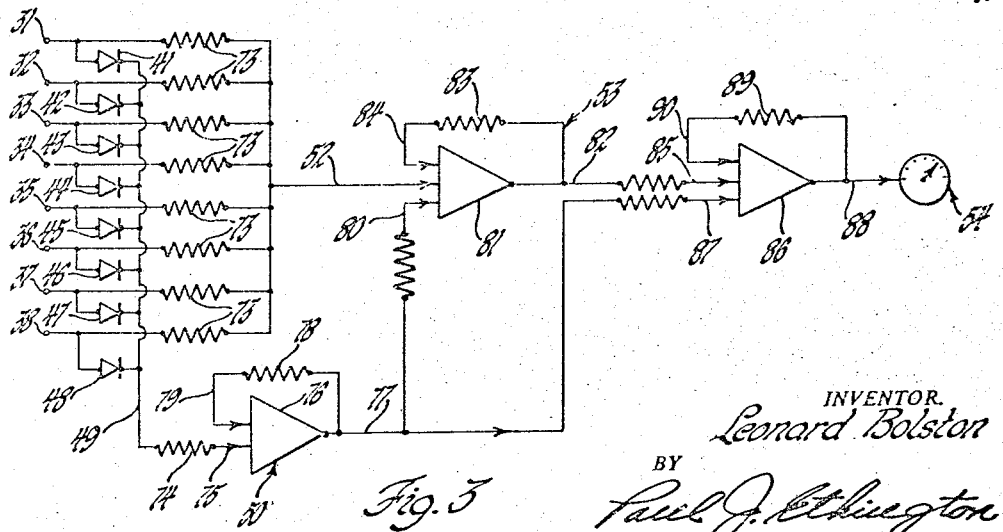

In FIGURE 3 the maximum selector 50 and the combining circuit 53 are shown in more detail. This particular arrangement is adapted to provide an output reading in accordance with the function $S_T = S_M + 0.3(S - S_M)$ as set forth above. The output terminals 31—38 of the function generators are shown connected together through a plurality of like resistors 73 to a common line or to the input 52 of the combining circuit 53. The terminals 31—38 are also connected through a plurality of diodes 41—48 to a common line 49 which in turn is connected through an input resistor 74 to an input 75 of a summing amplifier 76. The amplifier 76 is connected to an output line 77, and this output line is coupled through a feedback resistor 78 to an input 79 of the amplifier. The values of the resistors 74 and 78, and the remaining circuit components, are selected such that the overall gain of the maximum selector 50 is unity, resulting in an output on the output line 77 which is equal in magnitude to the maximum function generator output, but is inverted or negative. The output line 77 is applied through an input resistor to an input 80 of a second summing amplifier 81 in the combining circuit 53. The output of this amplifier is applied to an output line 82, and a portion of the output is coupled back through a feedback resistor 83 to another input 84 of the summing amplifier. A common terminal of the resistors 73 also appears as an input 52 to the amplifier 81. The values of the input and feedback resistors for the stage including the amplifier 81 are selected to provide an overall gain of 0.3, or for more precision, 0.27. Thus the output appearing on the line 82 will be the sum of the function generator outputs minus and the maximum function generator output, and this signal will be inverted and multiplied by a factor 0.3. This combined signal is applied through an input resistor to an input 85 of a further summing amplifier 86. The output of the maximum selector 50, appearing on the output line 77, is likewise applied through an input resistor to an input 87 of the amplifier 86. The output 88 of this amplifier is coupled back through a feedback resistor 89 to another input 90. Since both the combined signal and the maximum signal have been inverted, then the output appearing on the line 88 will be the sum of the maximum and combined signals, and this output is applied to the indicator 54 which may be any suitable type of voltage-responsive meter or recording means.

Figure 4:
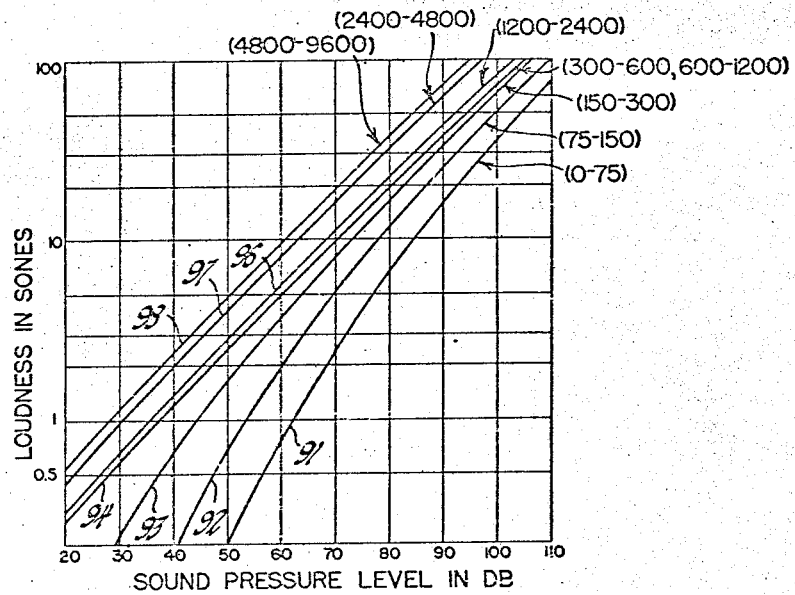
FIGURE 4 is a graphic representation in logarithmic co-ordinates of the subjective loudness characteristics of the various frequency bands utilized in the apparatus of FIGURE 1.

With reference to FIGURE 4, there is shown a graphic representation of loudness, in units of sones, plotted as a function of sound pressure level, in units of decibels above a reference level, for the eight octave bands in the audio spectrum as utilized in this invention. These characteristics were derived through experiments as set forth in the above-mentioned article by S. S. Stevens. A line 91 represents subjective loudness as a function of sound pressure for the lowest band or 0–75 cycles, corresponding to the channel including the filter 11 and the function generator 21. The function generator 21 necessary to reproduce this curve 91 is shown in detail in FIGURE 2. Likewise, a line 92 corresponds to the octave band of 75–150 cycles and represents the characteristics of the channel including the filter circuit 12 and function generator 22. A line 93 corresponding to 150–300 cycles is the basis for the transfer characteristics of the channel including the filter circuit 13 and function generator 23. The two channels including the filter circuits 14, 15 and the function generators 24, 25 corresponding to the octave bands 300–600 and 600–1200 cycles, both have similar transfer characteristics which are represented by a line 94. A specific example of the type of function generator necessary to provide a transfer characteristic resembling the line 94 is explained in detail with reference to FIGURES 5 and 6. The transfer characteristics of the channels including the filter circuits 16, 17, and 18 and the function generators 26, 27, and 28 are represented in FIGURE 4 by lines 96, 97, and 98, respectively. These channels correspond to the three octave bands between 1200 and 9600 cycles.

Figure 5:
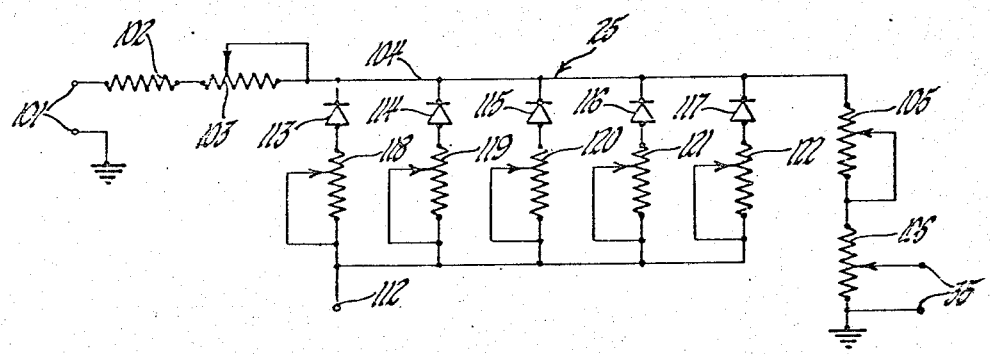
FIGURE 5 is a schematic diagram of one of the function generators utilized in the apparatus of FIGURE 1.
Figure 6:
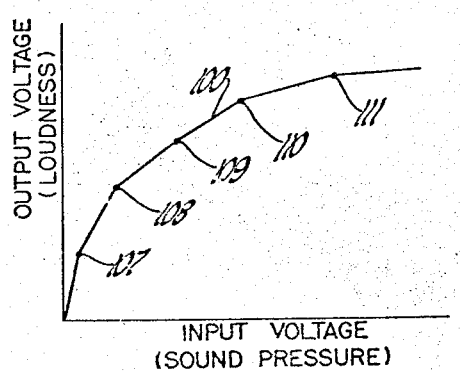
FIGURE 6 is a graphic representation in linear co-ordinates of loudness as a function of sound pressure for the function generator of FIGURE 5.

With reference to FIGURE 5, there is shown a function generator corresponding to the function generators 24 and 25 of FIGURE 1 which are necessary to develop outputs related to sound pressure according to the line 94 of FIGURE 4 which, in linear co-ordinates of output voltage vs. input voltage, may be represented by a line 100 of FIGURE 6. The function generator 25 includes input terminals 101, which are connected to the output of the generator circuit 15, and a voltage divider including fixed and variable resistors 102 and 103 connected by a line 104 to another set of variable resistors 105 and 106. The output terminal 35 of the function generator is connected to a variable tap on the resistor 106. To obtain a series of break points 107—111 as shown in FIGURE 6, a plurality of shunt circuits are connected to the common line 104, as shown in FIGURE 5. These shunt circuits include a plurality of Zener diodes 113—117, each being connected to a negative voltage source 112 through one of a set of series resistors 118—122. As plotted in FIGURE 6, the output voltage appearing at the terminal 35 is initially related to the input voltage across the terminals 101 by a linear function determined by the simple divider circuit comprising resistors 102, 103, 105, and 106. However, when an input voltage corresponding to a point 107 is reached, the Zener diode 113 breaks down. This provides the shunt across the divider circuit, and reduces the slope of the transfer characteristic. The characteristic will then follow a linear function until the break point 108 is reached, at which time the Zener diode 114 will break down, providing an additional shunt across the output of the voltage divider. It is seen that within limits virtually any function can be approximated in this manner by adjusting the variable resistors 103, 105, 106, and 118—122. The function generators 22, 23, 26, 27, and 28 necessary to reproduce the functions defined by the lines 92, 93, 96, 97, and 98 of FIGURE 4 are of the same form as the function generator 25 of FIGURE 5, with proper adjustments of the variable resistors.

In the operation of the apparatus described above, each of the eight octave channels will produce a D.C. output voltage, at the respective one of the terminals 31—38, which is related according to the subjective loudness function specified in FIGURE 4 to the sound pressure in the particular frequency-band. The maximum of the outputs appearing on the terminals 31—38 will appear on the line 49 since only one of the diodes 41—48 will conduct at any one time. For example, if the output at the terminal 33 is greater than any of the other outputs, then the diode 43 will conduct, the voltage on the line 49 will equal the voltage at the terminal 33, and this will prevent any of the remaining diodes from conducting. This maximum voltage will appear inverted on the line 77. The sum of all of the outputs will appear on the input 52 as an input to the amplifier 81, but since the maximum signal appears inverted at the input 80, the output on the line 82 will be a fraction of the sum of the outputs minus the maximum, or will equal the function $0.3(S-S_M)$. This output will appear on the input 85 of the summing amplifier 86 in an inverted form while the $S_M$ signal will appear on the input 87. Thus the output appearing on the line 88 will be related to the function $S_M+0.3(S-S_M)$. This signal is indicated on the indicator 54, producing a direct reading of loudness which may be calibrated in units of sones.

While this invention has been described in terms of an illustrative embodiment, it is of course understood that various modifications may be made by persons skilled in the art. It is contemplated that the appended claims will cover any such modifications as fall within the true scope of the invention.

I claim:
1. A loudness meter comprising pickup means adapted to produce a signal related to sound pressure, signal translating means connected to said pickup means to receive said signal, said signal translating means being adapted to produce a plurality of output voltages each related by one of a plurality of functions to sound pressure in one of a plurality of frequency bands, each of said plurality of functions corresponding to the subjective loudness characteristic for the particular frequency band, discriminating means connected to said signal translating means to receive all of said plurality of output voltages and adapted to produce a maximum output corresponding to the maximum thereof, combining means connected to said signal translating means to receive said output voltages and also connected to said discriminating means to receive said maximum output, said combining means being adapted to produce a combined output related by a given function to said electrical outputs and said maximum output, and indicating means connected to said combining means to receive said combined output.

2. A loudness meter comprising a sound pickup adapted to produce a signal related to sound pressure, a plurality of translating circuits connected to said pickup to receive said signal, each of said circuits being responsive to the portion of said signal in one of a plurality of frequency bands and being adapted to produce an electrical output related to said portion of said signal by a specified function, discriminating means connected to the outputs of all of said plurality of translating circuits to receive all of said electrical outputs and adapted to produce a maximum output corresponding to the maximum electrical output from said translating circuits, combining means connected to the outputs of all of said plurality of translating circuits to receive all of said electrical outputs and also connected to said discriminating means to receive said maximum output, said combining means being effective to produce a combined output related by a predetermined function to said electrical outputs and said maximum output, and indicating means connected to said combining means to receive said combined output and adapted to produce an indication thereof.

3. A loudness meter comprising a sound pickup adapted to produce a signal related to sound pressure, a plurality of octive filters connected to said pickup to receive said signal, each of said filters being adapted to produce an output voltage related to sound pressure in an octave band, a plurality of function generators, each of said function generators having an input connected to one of said filters to receive said output voltage and being adapted to produce an electrical output related to said output voltage by a specified function, discriminating means connected to the outputs of all of said plurality of function generators to receive all of said electrical outputs and adapted to produce a maximum output corresponding to the maximum thereof, combining means connected to said plurality of function generators to receive said electrical outputs and also connected to said discriminating means to receive said maximum output, said combining means being adapted to produce a combined output related by a given function to the sum of said electrical outputs and said maximum output, and indicating means connected to said combining means to receive said combined output.

4. A loudness meter comprising a sound pickup adapted to product a signal related to sound pressure, a plurality of octave filters connected to said pickup to receive said signal, each of said filters being adapted to produce an output voltage related to sound pressure in an octave band, a plurality of function generators, each of said function generators having an input connected to one of said filters to receive said output voltage and being adapted to produce an electrical output related to said output voltage by a specified function, discriminating means connected to the outputs of all of said plurality of function generators to receive all of said electrical outputs and adapted to produce a maximum output corresponding to the maximum thereof, combining means connected to the outputs of all of said plurality of function generators to receive all of said electrical outputs and also connected to said discriminating means to receive said maximum output in a subtractive relationship and effective to produce a combined output, and indicating means connected to said combining means and to said discriminating means to receive said combined output and said maximum output and adapted to produce an indication related to the sum thereof.

5. A loudness meter comprising a sound pickup adapted to produce a signal related to sound pressure, a plurality of translating circuits connected to said pickup to receive said signal, each of said circuits being responsive to the portion of said signal in one of a plurality of frequency bands and being adapted to produce an electrical output related to said portion of said signal by a specified function, discriminating means connected to the outputs of all of said plurality of translating circuits to receive all of said electrical outputs and adapted to produce a maximum output corresponding to the inverse of the maximum electrical output from said translating circuits, first combining means connected to the outputs of all of said plurality of translating circuits to receive all of said electrical outputs and also connected to said discriminating means to receive said inverted maximum output and effective to produce a combined output corresponding to the inverse of a predetermined fraction of the sum of the electrical outputs minus the maximum output, second combining means connected to said first combining means and to said discriminating means to receive said inverted combined output and said inverted maximum output and adapted to produce an output voltage corresponding to the sum of the maximum output plus the predetermined fraction of the sum of the electrical outputs minus the maximum output, and indicating means connected to said second combining means to receive said output voltage and adapted to indicate the magnitude thereof.

6. A loudness meter comprising a sound pickup adapted to produce a signal related to sound pressure, a plurality of octave filters connected to said pickup to receive said signal, each of said filters being adapted to produce an output voltage related to sound pressure in one of a plurality of adjacent octave bands in the audio spectrum, a plurality of function generators, each of said function generators having an input connected to one of said filters to receive said output voltage and being adapted to produce an electrical output related to said output voltage by a function which corresponds to the subjective loudness characteristic for the octave band, discriminating means connected to the outputs of all of said plurality of function generators to receive all of said electrical outputs and adapted to produce a maximum output corresponding to the inverse of the maximum electrical output, first combining means connected to the outputs of all of said plurality of function generators to receive all of said electrical outputs and also connected to said discriminating means to receive said inverted maximum output and effective to produce a combined output corresponding to the inverse of a predetermined fraction of the sum of the electrical outputs minus the maximum output, second combining means connected to said first combining means and to said discriminating means to receive said inverted combined output and said inverted maximum output and adapted to produce an output voltage corresponding to the sum of the maximum output plus the fraction of the sum of the electrical outputs minus the maximum output, and indicating means connected to said second combining means to receive said output voltage and adapted to indicate the magnitude thereof.

No references cited.